(12) United States Patent
Butsenko et al.

(10) Patent No.: US 8,380,455 B1
(45) Date of Patent: Feb. 19, 2013

(54) METHOD FOR PREDICTION OF A RESPONSE OF PARAMETER SENSOR

(76) Inventors: Volodymyr Butsenko, Kharkov (UA); Andrey Tkatchenko, Brooklyn, NY (US); Dmitry Butsenko, Brooklyn, NY (US)

(*) Notice: Subject to any disclaimer, the term of this patent is extended or adjusted under 35 U.S.C. 154(b) by 0 days.

(21) Appl. No.: 13/602,500

(22) Filed: Sep. 4, 2012

(51) Int. Cl.
*G01P 21/00* (2006.01)
*G01K 3/04* (2006.01)

(52) U.S. Cl. ............ 702/89; 702/130; 374/103; 374/107

(58) Field of Classification Search .................... 702/79, 702/85, 89, 90, 99, 130, 136, 176; 700/299, 700/300, 306; 374/110, 102, 103, 107, 169, 374/185
See application file for complete search history.

(56) References Cited

U.S. PATENT DOCUMENTS

| | | | |
|---|---|---|---|
| 6,698,921 B2* | 3/2004 | Siefert | 374/169 |
| 8,136,983 B2* | 3/2012 | Razzaghi | 374/103 |

\* cited by examiner

*Primary Examiner* — Manuel L Barbee
(74) *Attorney, Agent, or Firm* — Aleksandr Smushkovich

(57) ABSTRACT

A method for prediction of a response of a parameter sensor is provided. It's usable for measuring a parameter of an external object. The sensor is associated with microprocessors representing correction circuits, including correction elements, and a microprocessor implementing a program called 'calculator' characterized at least with a time constant and certain variables. The method provides for determining a first and second derivatives of the parameter, output signals of each correction element, setting a cycle for time counting by the calculator, forming the correction circuits, determining output signals of the elements, continuously calculating and recording the time constant, determining a first derivative of the correction circuit signal and modulus of the derivative, further compared with preset coefficients, and forming an equivalent of the sensor's output signal for checking the calculator.

15 Claims, 7 Drawing Sheets

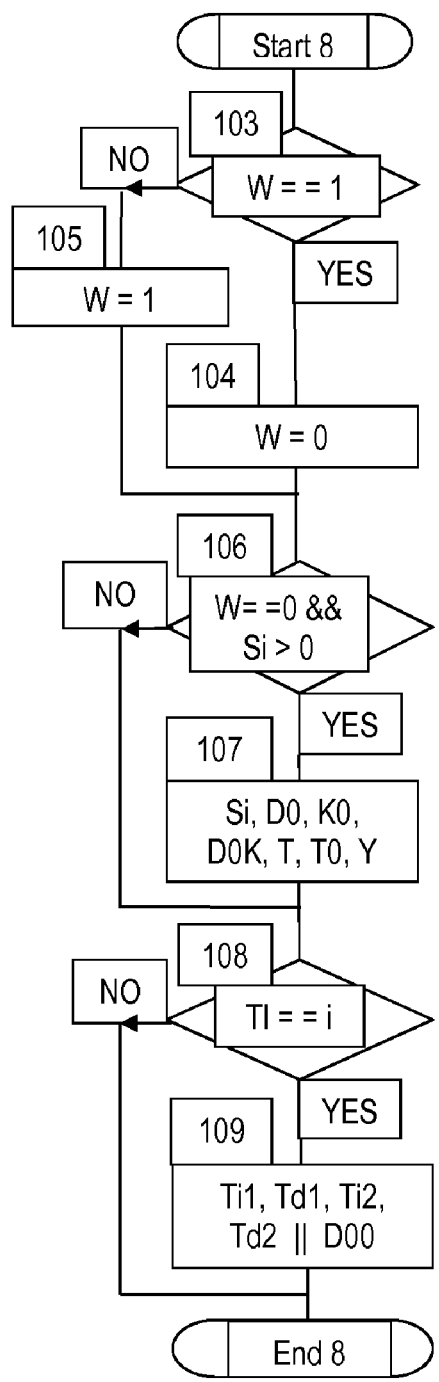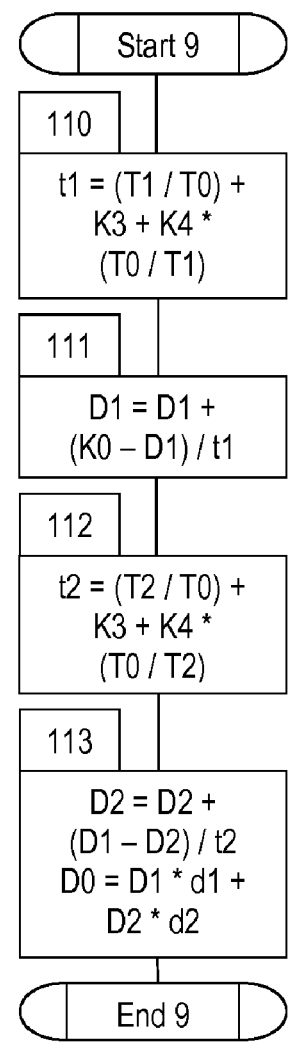
Fig. 12
Fig. 13

METHOD FOR PREDICTION OF A RESPONSE OF PARAMETER SENSOR

FIELD OF THE INVENTION

The present invention relates to measurement technology and can be applied in different areas of science and engineering, especially in the power generation industry, wherein large metallic masses are involved, for example, at measuring the temperature of atomic reactors, steam power boilers of thermal power plants, stopper-regulative valves of turbines, cylinders of high pressure turbines, etc.

BACKGROUND OF THE INVENTION

Nowadays, a prediction of response of a sensor measuring a certain parameter is of great interest. It is very important to predict such sensor response without delay or with a minimum delay, for example, to determine annex act temperature used for feedback in temperature control regulators that would allow for enhancing the reliability of operation of technological equipment in modes of variable exploitation of such regulators, during operation of power generation units of a nuclear power plant. Besides, it is essential to shorten a delay time of sensors measuring parameters of medical thermometers, power meters, modulating transducers, as well as during examination and installation of automatic control systems.

There is known a related art device relevant to the claimed technical solution being a predictive temperature measurement system [see reference R-1], which includes determination of the first derivative and the second derivative of a measured parameter. The system implements a method that encompasses determining an average of the first derivative and the second derivative on the basis of a predetermined number of temperature samples taking into account additives on each such average. It takes about two seconds to predict a response of the parameter sensor. Though the aforementioned method allows obtaining predictions of parameter sensor response, a disadvantage of the method is that such predictions are determined with a delay, which lowers the accuracy of measurements. The above method does not measure the delay time, which does not help preventing such delays. The mentioned disadvantages derive from the fact that the related art method does not account for time constants being characteristics of transfer functions of the parameter sensors, which reduces the rate of measuring.

There is known another related art device relevant to the claimed technical solution being a system for estimation of ambient temperature [see reference R-2], including an electronic device, wrapping-round a power generation unit, which is subjected to even heating during operation. The system encompasses, at least, a digital processor and a first temperature sensor and a second temperature sensor. The sensors are adapted to measure the first and the second temperature as functions of time accordingly, and a transfer time for the first temperature differs from a transfer time for the second temperature. The processor is adapted to determine that estimations of the ambient temperature is based at least on the first and second temperature measurings as functions of time. However, shortcomings of the aforementioned system are: the predictions of sensor temperature are determined with a delay that reduces accuracy of measurements in time; the time is not measured; causes of the delay are not ascertained, and thus the delay cannot be avoided. The shortcomings are conditioned by the fact that the above-described method does not account for time constants being characteristics of transfer functions of the parameter sensors, which reduces the rate of measuring the parameter.

BRIEF SUMMARY OF THE INVENTION

The present invention is intended to overcome the aforementioned shortcomings through a proposed method and a system for prediction of a response generated by a parameter sensor, which parameter sensor comprises: correction circuits; flexible control of an input signal by aperiodic circuits; calculation of time constants of the aperiodic circuits of the first and the second orders, which time constants are included in a transmission function of the parameter sensor. As a result, after the input of the calculated time constants into the correction circuits, the speed and accuracy of measuring the parameters are significantly increased.

The inventive solution contemplates a computer assisted method for prediction of a response of a parameter sensor (D0) used for measuring a parameter of an external object; —said parameter sensor (D0) is associated with a pre-programmed microprocessor herein called a first correction circuit (D00) arranged sequentially with said parameter sensor (D0), the first correction circuit (D00) comprises at least two sequential aperiodic correction elements, the first correction circuit (D00) carries out time correction of a signal received from said parameter sensor (D0), and—said parameter sensor (D0) is associated with a microprocessor implementing a program called a 'calculator', said calculator includes: a power counter (n), (i.e. a counter of mathematical power of a number, e.g. $K''$); a control variable (i); and a repetitive program cycle 'for' with a cycle continuation variable (TI); said calculator is characterized with: a time constant (T) characterized with limits of calculation accuracy (Ch), the time constant (T) is calculated by the calculator and is inputted into the parameter sensor (D0); a predetermined time parameter called a dead zone, and characterizing a range of changing the time constant T, said dead zone has a predetermined minimal boundary (Tz1) and a predetermined maximal boundary (Tz2); a variable (Si) holding a time value passed from the beginning of calculation carried out by the calculator; a first time variable (Td1); a second time variable (Td2); and a query time period (T0) of said parameter sensor (D0); said parameter sensor (D0) is associated with a pre-programmed microprocessor herein called a second correction circuit (D0K) arranged sequentially with said parameter sensor (D0), and comprising at least two elements; and said parameter sensor (D0) is associated with a pre-programmed microprocessor herein called a third correction circuit (P) connected with said parameter sensor (D0), and comprising one element, said correction circuit (P) is a component of the calculator, and said correction circuit (P) re-creates a first derivative (DM) of the signal said correction circuit (P); said method comprising the steps of: determining a first derivative and a second derivative of said parameter; determining output signals of each said element of the first correction circuit (D00); setting up the cycle 'for' and assigning to the variable (Si) of a 0-value thereby starting time counting carried out by the calculator; forming the first correction circuit (D00); determining output signals of each said elements of the second correction circuit (D0K); forming the second correction circuit (D0K); forming the third correction circuit (P); determining said first derivative (DM) of an output signal of the third correction circuit (P); using said calculator, calculating the time constant (T) of the aperiodic elements of the parameter sensor (D0); recording the time constant (T) calculated and assigning thereof to the first time variable (Td1); entering the first time variable (Td1) into the first element of the second correction circuit (D0K); using said calculator, calculating a next value of said time constant (T) and assigning thereof to the second time variable (Td2); entering the second time variable (Td2) into the second element of the second correction circuit (D0K); using said calculator, continuously calculating a current value of the time constant (T), while determining a condition of: —if the current value of the time constant (T) is lower than the minimal boundary (Tz1) and the derivative (DM) is lower than zero, then the power counter (n) subtracts 1; —if the current value of the time constant (T) is greater than the maximal boundary (Tz2) and the derivative (DM) is greater than zero, then the power counter (n) sums up 1; calculating new values of the query time period (T0), based on the current value of said time constant (T); based on the calculated value of said query time period (T0), —determining the current value of said minimal boundary (Tz1), when the power counter (n) subtracts 1, and—determining the current value of said maximal boundary (Tz2), when the power counter (n) sums up 1; continuously determining said limits of the calculation accuracy (Ch); continuously recording the current values of the power counter (n); entering the calculated current time variables (Td1) and (Td2) into the second correction circuit (D0K); determining a time of termination of the cycle 'for'; determining a first derivative (DB0) of the signal of said second correction circuit (D0K) and a modulus thereof, if the modulus is less than a preset coefficient (K19), then a current value of said control variable (i) is assigned to the cycle continuation variable (TI); and forming an equivalent of an output signal of the parameter sensor (D0) for checking said calculator.

An output signal of a first correction element (P01) of the first correction circuit (D00) is calculated by formula below:

$$P01 = D0 + C01 * Kt01,$$

wherein:
P01 is an output signal of the first correction element;
D0 is an output signal of parameter sensor;
C01 is a derivative of parameter sensor signal;
Kt01 is a first coefficient of amplification from the first time variable Td01;

$$C01 = D0 - E01;$$

The formula's parameters can be obtained as follows: E01=E01+C01;
E01 is an integral of derivative C01;

$$Kt01 = Tk01 * ((Td01/T0) - K3 + K4 * (T0/Td01));$$

Tk01 is a coefficient of protection;
Td01 is a first time variable of the first correction element (P01);
T0 is a query time period of the parameter sensor;
K3 is a coefficient equal to 0.5;
K4 is coefficient equal to 0.083333194445.

Besides, the output signal of a second correction element, corresponding to the output signal of the first correction circuit (D00), is calculated by formula below:

$$D00 = P01 + C02 * Kt02,$$

wherein: D00 is an output signal of the first correction circuit (D00), which corresponds to the output signal of the second correction element;
P01 is an output signal of the first correction element (P01);
C02 is a derivative of the signal of the first correction element;

Kt02 is a second coefficient of amplification from the second time variable Td02;

$$C02 = P01 - E02;$$

$$E02 = E02 + C02;$$

E02 is an integral of derivative C02;

$$Kt02 = Tk02 * ((Td02/T0) - K3 + K4 * (T0/Td02));$$

Tk02 is a coefficient of protection;
Td02 is a second time variable of the second correction element;
T0 is a query time period of the parameter sensor;
K3 is a coefficient equal to 0.5;
K4 is a coefficient equal to 0.083333194445.

At that time, from the beginning of calculation (Si) up to a time for recording, a time constant (T) is calculated by formula below:

$$Si = Si + T0.$$

It makes sense to calculate the output signal of the first correction element (P01) of the second correction circuit (D0K) by formula below:

$$P1 = D0 + C1 * Kt1,$$

wherein:
P1 is an output signal of the first correction element;
D0 is an output signal of the parameter sensor;
C1 is a derivative of the signal of the parameter sensor;
Kt1 is a first coefficient of amplification of the first time variable Td1;

$$C1 = D0 - E1;$$

$$E1 = E1 + C1;$$

E1 is an integral of derivative C1;

$$Kt1 = Tk1 * ((Td1/T0) - K3 + K4 * (T0/Td1));$$

Tk1 is a coefficient of protection;
Td1 is a first time variable of the first correction element;
T0 is a query time period of the parameter sensor;
K3 is a coefficient equal to 0.5;
K4 is a coefficient equal to 0.083333194445.

Besides, the output signal of the second correction element of the second correction circuit (D0K) is calculated by formula below:

$$D0K = P1 + C2 * Kt2,$$

wherein:
D0K is an output signal of the second correction circuit, which corresponds to the output signal of the second correction element;
P1 is an output signal of the first correction element;
C2 is a derivative of the first correction element signal;
Kt2 is a second coefficient of amplification of the second time variable Td2;

$$C2 = P1 - E2;$$

$$E2 = E2 + C2;$$

E2 is an integral of derivative C2;

$$Kt2 = Tk2 * ((Td2/T0) - K3 + K4 * (T0/Td2));$$

Tk2 is a coefficient of protection;
Td2 is a second time variable of the second correction element;
T0 is query time period of the parameter sensor;
K3 is a coefficient equal to 0.5;
K4 is a coefficient equal to 0.083333194445.

It is preferably to calculate an output signal of the third correction circuit (P) by formula below:

$$P=D0K+DE0*Q,$$

wherein:

P is an output signal of the third correction circuit;

D0K is an output signal of the second correction circuit;

DE0 is a first derivative of the output signal of the second correction circuit (D0K);

Q is an integral, which is proportional to calculated time constant T;

$$DE0=D0K-F;$$

$$F=F+DE0;$$

F is an integral of derivative DE0;

$$Q=Q+A1*Y*W;$$

A1 is a temporary variable, which manipulates the integral;

Y is a coefficient, which allows/disallows calculating an integral that is defined through the second derivative DK from the signal of the second correction circuit D0K;

W is a coefficient of stability of integral calculation, which changes every tact from zero to one and vice versa;

$$A1=DM*KU*Q^2;$$

DM is a first derivative of the output signal of the third correction circuit (P);

KU is a coefficient of amplification dependable from a level of the output signal of the second correction circuit D0K and an actuating signal K0 of the parameter sensor.

Besides, the time constant (T) of an element of the parameter sensor (D0) is defined in accordance with the query time period (T0) of the parameter sensor and is calculated by formula below:

$$T=T0*((Q+K3)-K7/(Q+K3)),$$

wherein:

T is the time constant of the element of the parameter sensor D0;

T0 is a query time period of the parameter sensor;

Q is an integral of the function A1;

K3 is a coefficient equal to 0.5;

K7 is a coefficient equal to 0.0833338887.

It makes sense to calculate the query time period (T0) of the parameter sensor by formula below:

$$T0=pow(K,n)*K10,$$

wherein:

T0 is a query time period of the parameter sensor;

pow(K,n)–number K raised to n power;

K is a coefficient equal to 2;

K10 is a coefficient equal to 0.000001.

The calculator is characterized with a predetermined time parameter called a 'dead zone', which determines a range of changing the time constant T. The dead zone has a predetermined minimal boundary (Tz1) and a predetermined maximal boundary (Tz2). At that, a value of the minimal boundary (Tz1) of the dead zone is calculated by formula below:

$$Tz1=T0*K14,$$

wherein:

Tz1 is a minimal boundary of the dead zone;

K14 is a coefficient equal to 250.

Besides, value of the maximal boundary (Tz2) of the dead zone is calculated by formula below:

$$Tz2=T0*K16,$$

where:

Tz2 is a maximal boundary of the dead zone;

K16 is a coefficient equal to 750.

Also, accuracy limits (Ch) of the calculation of the time constant T of an element of the parameter sensor D0 are determined as follows:

$$Ch=T*K17,$$

wherein:

T is the time constant of the element of the parameter sensor (D0);

K17 is a coefficient equal to 0.00003.

It is preferably to calculate a value of the first output signal of the first aperiodic element (D1) of an equivalent of the parameter sensor (D0) by formula below:

$$D1=D1+(K0-D1)/t1,$$

wherein:

D1 is a first output signal of the first aperiodic element (D1) of the equivalent of the parameter sensor (D0);

K0 is an actuating signal of parameter sensor;

t1 is a time constant of the first aperiodic element (D1) from the first value of the time constant (T1) assigned for control of the time calculator of the parameter sensor (D0);

$$t1=(T1/T0)+K3+K4*(T0/T1);$$

wherein

T1 is a first time constant to be set for the first aperiodic element (D1);

T0 is the query time period of the parameter sensor;

K3 is a coefficient equal to 0.5;

K4 is a coefficient equal to 0.083333194445.

Besides, the value of the second output signal (D2) of the parameter sensor equivalent (D0) is calculated by formula below:

$$D2=D2+(D1-D2)/t2,$$

wherein:

D2 is the second output signal of the parameter sensor equivalent (D0) (corresponds to the output signal of the second aperiodic element);

D1 is the output signal of the first aperiodic element;

t2 is a time of the second aperiodic element (D2) of the equivalent of parameter sensor (D0) from a second time constant (T2) assigned for control of the time calculator of the parameter sensor (D0);

$$t2=(T2/T0)+K3+K4*(T0/T2);$$

wherein

T2 is a second time constant to be set for of the second aperiodic element (D2);

T0 is a query time period of the parameter sensor;

K3 is a coefficient equal to 0.5;

K4 is a coefficient equal to 0.083333194445.

At that, checking of the calculator of the time constants of the parameter sensor is performed based on the output signals of the equivalent of the parameter sensor (D0):

$$D0=D1*d1+D2*d2,$$

wherein:

D1 is an output signal of the first aperiodic element;

d1 is a coefficient of choice; if it is equal to 1, then a coefficient of choice d2 is equal to 0 and vice versa;

D2 is an output signal of the second aperiodic element, which corresponds to the two elements of the equivalent of parameter sensor (D0);

d2 is a coefficient of choice; if d2 is equal to 1, then d1 is set to 0.

For improvement of the process for prediction of the sensor response for a parameter measured, there were sequentially formed three correction circuits, comprising elementary aperiodic elements and high-speed (forcing) elements, developed especially for a flexible control over input signals, and which correction circuits are also included into the transfer function of the parameter sensor equivalent. At that, the coefficient of proportionality of the elements is assumed to be equal to 1.

The output signal of the 1st-order aperiodic element (LE) is usually calculated at the input signal from 0 to 1 and the initial zero time by the following formula:

$$X\text{output} = 1 - \exp(-t/T), \quad (1)$$

wherein:
Xoutput is an output signal of LE;
t is a summarized current time;
T is a time constant of LE.

The output signal of LE, calculated by formula (1) is replaced with the output signal of the developed element LE and calculated by the following formula:

$$X\text{output} = X\text{output} + (X\text{input} - X\text{output})/T le, \quad (2)$$

wherein:
Xoutput is an output signal of LE;
Xinput is an input signal that changes from 0 to 1 at an incremental excitation signal;
Tle is a time constant of a new LE.

The output signals of LE are represented in formula (1) and formula (2) differ in accuracy by their transfer characteristics. Experimentally and taking into account the entered constant coefficients new time Tle, which corresponds to the time constant T, has been corrected and it is calculated by the following formula:

$$Tle = (T/T0) + K3 + K4*(T0/T), \quad (3)$$

wherein:
Tle is the corrected time constant of LE;
T is the time constant of LE, which should not be equal to zero;
T0 is the query time period of the parameter sensor;
K3 is the coefficient equal to 0.5;
K4 is the coefficient equal to 0.083333194445.

The so corrected time constant of LE improves the precision of transfer between the transient characteristics of LE represented in formula (1) and formula (2) and allows for fifteen decimal places of accuracy.

The algorithm of formation of the output signal of LE represented in formula (2) and formula (3) is used further during a scheduled inspection of the entire calculation algorithm for time constants of parameter sensor elements as one element of parameter sensor equivalent.

The output signal of high-speed element (HSE) is usually calculated at the input signal from 0 to 1 and at the original zero time by the following formula:

$$X\text{output} = \exp(-t/Td), \quad (4)$$

wherein:
Xoutput is an output signal of HSE;
t is a summarized current time;
Td is a time constant of HSE.

The signal of the high-speed element defined by formula (4) is replaced with the signal of the developed high-speed element and calculated by the following formula:

$$X\text{output} = C*KT, \quad (5)$$

wherein:
Xoutput is an output signal of the high-speed element (HSE);
C is a derivative function of the input signal Xinput;
KT is a coefficient of amplification, which corresponds to the time constant Td.

At that the derivative function C of input signal Xinput is calculated by formula:

$$C = X\text{input} - E, \quad (5.1)$$

wherein:
Xinput is an input signal that varies from 0 to 1 at an excitation step-changing signal;
E is an integral function from the derivative function C.

At that integral E from derivative function C is calculated by the following formula:

$$E = E + C. \quad (5.2)$$

The output signals of high-speed elements represented in formula (4) and formula (5) differ in accuracy by their transfer characteristics. There was experimentally defined a corrected coefficient of amplification of the derivative of output signal KT taking into account the time coefficients entered and the time constant Td of the high-speed element, which is calculated by the following formula:

$$KT = Kz*((Td/T0) - K3 + K4*(T0/Td)), \quad (6)$$

wherein:
KT is a corrected coefficient of amplification;
Kz is a coefficient of protection;
Td is a time constant of HSE;
T0 is a query time period of the parameter sensor;
K3 is a coefficient equal to 0.5;
K4 is a coefficient equal to 0.083333194445.

The corrected coefficient of amplification of the derivative of output signal KT received in such a way improves the precision of transfer between transient processes of output signals of the high-speed elements represented in formula (4) and formula (5) and allows for accuracy of 15 places after the decimal point.

The algorithm of formation of an output signal of the high-speed element defined by formula (5) is further used in a sequential correction circuit (SCD) directly in the circuit of the parameter sensor and in the time calculator of the parameter sensor.

An output signal of the sequential correction device (SCD) is determined in accordance with the signal of the parameter sensor and the output high-speed signal multiplied by the coefficient of amplification, which corresponds to the time constant of one high-speed element, and is calculated by the following formula:

$$X\text{output} = X\text{input} + C*KT_K, \quad (7)$$

wherein:
Xoutput is an output signal of SCD;
Xinput is the input signal;
C is the derivative of input signal Xinput;
KTk is a corrected coefficient of amplification (similarly calculated according to formula 6).

In such a way the time constants of the 1st-order aperiodic element and the 2nd-order aperiodic element were determined, which are included into the transfer function of the parameter sensor, and, as a result, a higher speed and better accuracy of parameter measuring were achieved.

Briefly stated, there is provided a method for prediction of a response of a parameter sensor. It's usable for measuring a parameter of an external object. The parameter sensor is associated with microprocessors representing correction circuits, including correction elements, and a microprocessor implementing a program called 'calculator' characterized at least with a time constant and certain variables. The method provides for determining a first and second derivatives of the parameter, output signals of each correction element, setting a cycle for time counting by the calculator, forming the correction circuits, determining output signals of the elements, continuously calculating and recording the time constant, determining a first derivative of the correction circuit signal and modulus of the derivative, further compared with preset coefficients, and forming an equivalent of the sensor's output signal for checking the calculator.

While the invention may be susceptible to embodiment in different forms, there are shown in the drawings, and will be described in detail herein, specific embodiments of the present invention, with the understanding that the present disclosure is to be considered an exemplification of the principles of the invention, and is not intended to limit the invention to that as illustrated and described herein.

BRIEF DESCRIPTION OF DRAWINGS

The subject matter of the present invention is illustrated in the attached drawings, wherein:

FIG. 12 shows a flowchart depicting an algorithm for determining the moment of recording the counter's current parameters during the time calculation of the parameter sensor according to a preferred embodiment of the present invention.

FIG. 13 shows a flowchart depicting an algorithm for determining a parameter sensor equivalent.

BRIEF DESCRIPTION OF PREFERRED EMBODIMENTS

Figure 1:
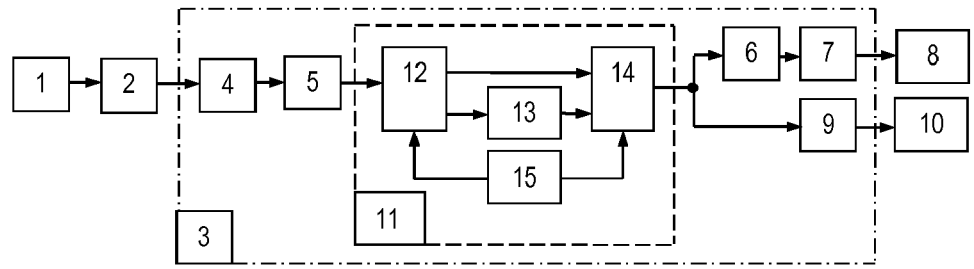
FIG. 1 shows a flowchart depicting functional units, connection thereof, and a structure for measuring, normalization, and correction of a parameter of the parameter sensor, according to a preferred embodiment of the present invention.

A general idea of the present invention is illustrated on FIG. 1 that shows a flowchart of a system, composed of a number of functional units and connection thereof, which system is employed for measuring, normalization, and correction of a parameter of the parameter sensor. The system comprises: an object (1) having a parameter to be measured; a parameter sensor (2) that measures the aforesaid parameter; a normalization transformer (3) for normalizing the aforesaid parameter; an analog-digital converter (4) (herein also called 'ADC') with an entrance adaptor establishing a correspondence between the output and input resistance; a digital normalizing device (5), establishing a correspondence between the ranges of an input measured signal and an output signal of the aforesaid normalization transformer; an output digital-analog converter (6) (herein also called 'DAC'); an adaptor device (7) connected to the output of DAC and operating for a communication line; an output analog signal (8), inputted into a regulator of parameter or control (not shown) mainly as a normalized current signal, but rarely as a normalized voltage signal; an adaptor device (9) intended for transmission of the signal into a communication line; an output digital signal (10), entering the regulator of parameter or control (not shown). The parameter sensor (2) includes: a correction device (11), which complements the normalization transformer (3). The correction device (11), in turn, comprises: an entrance digital commutation module (12); a digital correction module (13) regarded by the instant inventor as a novel and non-obvious subject matter of the present invention; an exit digital commutation module (14); a signal (15) for control of the commutation modules (12) and (14), allowing for the normalization transformer (3) to produce a normalized signal of the measured parameter with or without a correction of the signal of measured parameter.

Following is the description of an exemplary preferred embodiment of the inventive method for prediction of a response from the parameter sensor.

Figure 2:
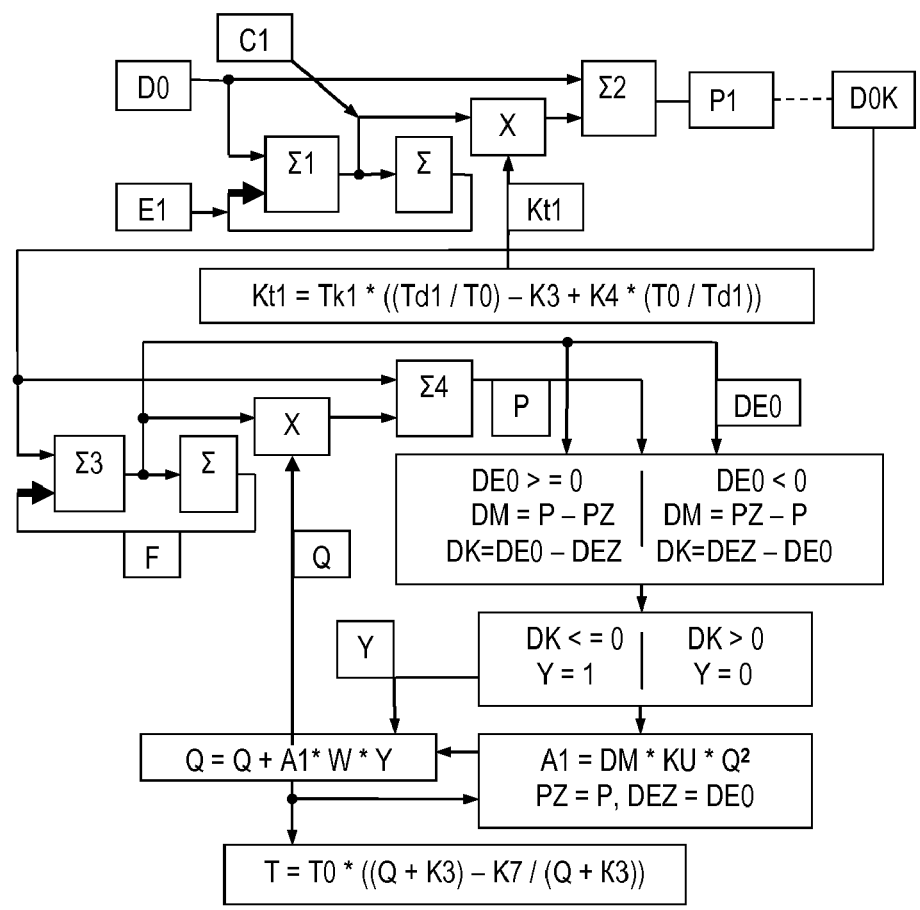
FIG. 2 shows a flowchart depicting a structure of a time calculator and connections between elements thereof, according to a preferred embodiment of the present invention.

The method contemplates an algorithm, whose flowchart is depicted on FIG. 2.

In this example, an input signal D0 of the parameter sensor is supplied to one element of a sequential correction circuit, comprising a first summarizing unit (herein called 'summator') Σ1 and a second summator Σ2. The input signal D0 comes to a first input port of the summator, whereas an integrator signal E1 with the reversed sign from a first derivative C1 comes to a second input port of the first summator.

The input signal of parameter sensor D0 also comes to a first input port of the second summator, whereas a first derivative C1 of the parameter sensor signal multiplied by a coefficient of amplification Kt1 (which coefficient corresponds to a calculated time constant Td1 of an element of the parameter sensor as described above) comes to a second input port.

The corrected coefficient of amplification Kt1 is analogously calculated according to formula 6 described above.

At that, if the coefficient of amplification KT is defined as Kt1 and a coefficient of protection Kz is defined as Tk1, then the coefficient of amplification Kt1 is calculated in accordance with the formula below:

$$Kt1 = Tk1*((Td1/T0) - K3 + K4*(T0/Td1)). \qquad (8)$$

The output signal of the second summator D0K depending on the fact of inputting or non-inputting the time Td1, is the corrected or non-corrected signal D0 of the parameter sensor.

Further, it is considered that the time Td1 is not entered, the coefficient of protection Tk1 is equal to zero, and then the output signal of D0K will correspond to the input signal D0 of the parameter sensor.

A calculator of the time constant of the parameter sensor comprises a sequential correction circuit with an integrator F (rather than E1) and a first derivative DE0 of the parameter sensor (rather than C1) multiplied by an integrator value Q (rather than Kt1) and an output signal P (rather than D0K).

A level of integral Q is then calculated; the level of integral corresponds to the calculated time constant T of the parameter sensor. At first, a derivative DM of the signal P is calculated, whereas the sign of this derivative is determined depending on the sign of the first derivative DE0 of the input signal D0 of the parameter sensor.

Then, a second derivative DK is calculated; this derivative is necessary for calculation of a coefficient Y, which allows/disallows to calculate the integral determined through the second derivative DK from the signal D0K of the second correction circuit. If the second derivative DK is less than or equal to zero, a level 1 is assigned to the coefficient Y and this allows to change the integrand of Q, but if the second derivative DK is more than zero, a level 0 is assigned to the coefficient Y and this disallows to change the integrand of Q.

Afterwards there is calculated a signal A1 of the integrand of integral Q, which is equal to the derivative DM multiplied by the coefficient of amplification KU and by integral Q raised to the second power. Before inputting the signal A1 into integrand Q, the signal A1 is discriminated on the highest and lowest levels.

Then integral Q is calculated, which is equal to the sum of the current integral Q and the signal A1 multiplied by the coefficients W and Y.

Thereafter, the time constant T of the aperiodic element of the parameter sensor is calculated with respect to corresponding constant coefficients by the formula below:

$$T = T0*((Q+K3) - K7/(Q+K3)), \qquad (9)$$

wherein:

T is the time constant of the element of the parameter sensor D0;

T0 is a query time period of the parameter sensor;

Q is a level of signal of integral Q;

K3 is a coefficient equal to 0.5;

K7 is a coefficient equal to 0.0833338887.

Figure 3:
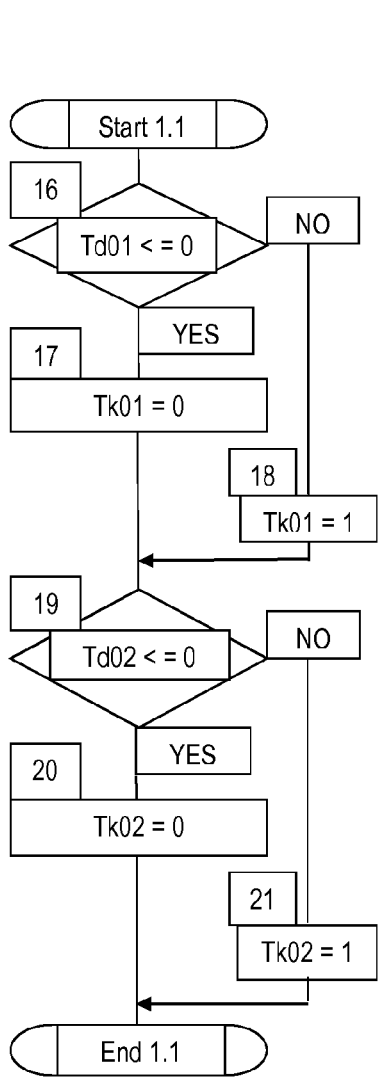
FIG. 3 shows a flowchart depicting an algorithm for formation of coefficients of protection of the first correction circuit depending on a level of time parameters entered, according to a preferred embodiment of the present invention.

The inventive method contemplates a preprogrammed computer algorithm (Start 1.1-End 1.1) for formation of protection coefficients Tk01 and Tk02 of the first correction circuit depending on the level of entered time values, which algorithm is depicted on FIG. 3. The algorithm can be described as follows:

The first correction circuit D00 includes a determinant (16) of the level of a first time value Td01, and if it is less than or equal to 0, the level of zero is assigned to a coefficient of protection Tk01 (17), otherwise the level of one is assigned to a coefficient Tk01 (18). Regarding the determinant of a second time value Td02 (19), if it is less than or equal to 0, the level of zero is assigned to a coefficient of protection Tk02 (20), otherwise the level of 1 is assigned to coefficient Tk02 (20).

Figure 4:
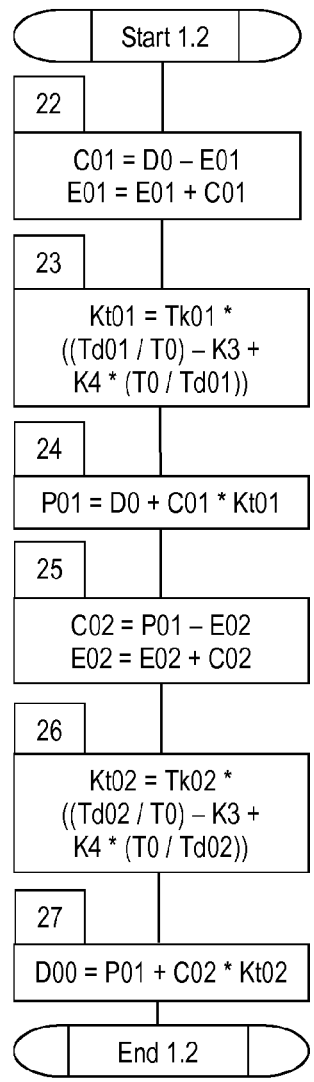
FIG. 4 shows a flowchart depicting an algorithm of a first correction circuit located sequentially with the parameter sensor, and capable of inputting up to two time parameters as they are being calculated, according to a preferred embodiment of the present invention.

FIG. 4 shows a preprogrammed computer algorithm (Start 1.2-End 1.2) for calculation of the first correction circuit D00, connected sequentially with the parameter sensor D0, with inputting up to two time values as they are calculated, consists of the following: a derivative C01 (22) of the sensor signal D0 and an integral component E01 (22) of the derivative C01 are calculated.

A coefficient of amplification Kt01 (23) is calculated, for which: from the first time value Td01 (obtained as a product of a protection coefficient Tk01 multiplied by an expression in parentheses obtained as: from a quotient of the first time value Td01 divided by a query time period T0 of the sensor signal) a coefficient K3 is subtracted; and then a coefficient K4 multiplied by a quotient of the query time period T0 of the sensor signal divided by the first time value Td01 is added.

Calculation of a signal of the first correction circuit P01 (24) is equal to a sum of the signal of parameter sensor D0 and the derivative C01 multiplied by a coefficient of amplification Kt01. Calculation of a second correction element consists of: a calculation of a derivative C02 (25) of the signal of the first correction element P01 and an integral component E02 (25) of the derivative C02.

A coefficient of amplification Kt02 (26) is calculated, for which: from the second time value Td02 (obtained as follows: Tk02 is multiplied by an expression in parentheses, from a quotient of the second time value Td02 divided by a query time period T0 of the sensor signal) a coefficient K3 is subtracted; then a coefficient K4 is multiplied by a quotient of the query time period T0 of the sensor signal divided by the second time value Td02 is added.

Calculation of an output signal of the first correction circuit D00 (27): it is equal to a sum of the signal of the first correction element P01 and its derivative C02 multiplied by a coefficient of amplification Kt02.

Then, protection coefficients Tk1 and Tk2 of the second correction circuit are determined.

Figure 5:
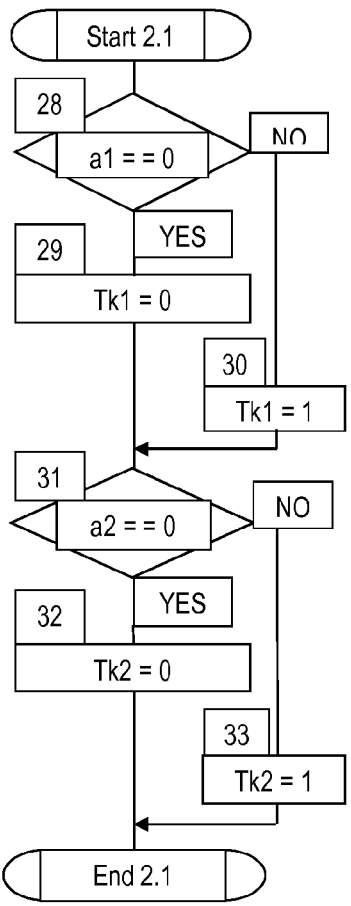
FIG. 5 shows a flowchart depicting an algorithm for formation of coefficients of protection of a second correction circuit depending on a level of coefficients, which determine recording the calculated time parameters of the parameter sensor, according to a preferred embodiment of the present invention.

A preprogrammed computer algorithm (Start 2.1-End 2.1) for formation of the protection coefficients of the second correction circuit, depending on a feature of the record of entered time values, is shown on FIG. 5. It includes: a feature of determination (28): 'Is the first time value T of a coefficient a1 calculated or not calculated?'; if the coefficient a1 is equal to 0, a protection coefficient Tk1 (29) is assigned 0; otherwise the protection coefficient Tk1 (30) is assigned 1; a feature of determination (31): 'Is the second time value T of a coefficient a2 calculated or not calculated?'; if the coefficient a2 is equal to 0, a protection coefficient Tk2 (32) is assigned 0; otherwise the protection coefficient Tk2 (33) is assigned 1.

Figures 6, 7:
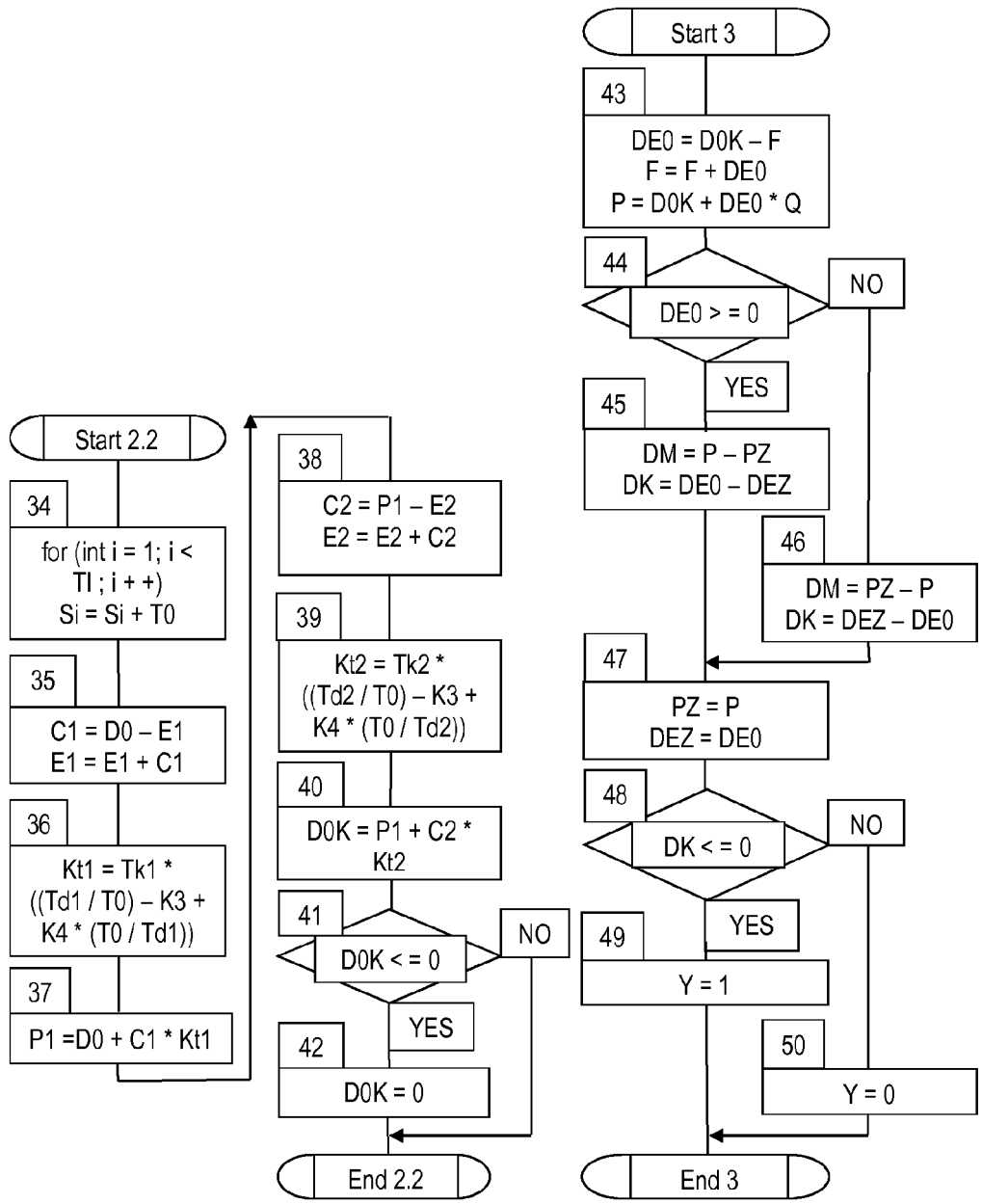
FIG. 6 shows a flowchart depicting an algorithm of a second correction circuit of the time counter of the parameter sensor located sequentially with the parameter sensor and capable of inputting the rein to up to two time parameters as they are being calculated, according to a preferred embodiment of the present invention.
FIG. 7 shows a flowchart depicting an algorithm of a third correction circuit located sequentially with the second correction circuit and capable of inputting the rein to the signal of the integral function being calculated instead of a coefficient of amplification, according to a preferred embodiment of the present invention.

FIG. 6 shows a preprogrammed computer algorithm (Start 2.2-End 2.2) for a calculator of the second correction circuit for calculating time values of the parameter sensor, which second correction circuit is connected sequentially with the parameter sensor, with inputting up to two time values thereinto, while the time values are being calculated. The algorithm comprises a repetitive program structure (cycle) 'for'

(34), which includes a control variable i, conditions of the cycle continuation TI, a sum of the control variable i++. A total current time from the beginning of calculation Si (34) is calculated.

Calculation of the first correction element P1 of the second correction circuit D0K comprises the following calculations.

A derivative C1 (35) of the signal of sensor D0 and an integral component E1 (35) of the signal of derivative C1 are calculated.

A coefficient of amplification Kt1 (36) is calculated as follows: from the first time value Td1, (obtained as follows: a protection coefficient Tk1 is multiplied by an expression in parentheses, in which a quotient of the first time value Td1 is divided by a query time period T0 of the sensor) a coefficient K3 is subtracted; then a coefficient K4 multiplied by the query time period T0 divided by the first time value Td1 is added.

Calculation of a signal of the first correction element P1 (37) is equal to a sum of the signal of the parameter sensor D0 and the derivative C1 multiplied by a coefficient of amplification Kt1. Calculating the second correction circuit D0K consisting of the following calculations: a derivative C2 (38) of signal P1 and an integral component E2 (38) of the derivative C2.

A coefficient of amplification Kt2 (39) is calculated as: from the second time value Td2, (obtained as follows: a protection coefficient Tk2 is multiplied by an expression in parentheses, in which a coefficient K3 is subtracted from a quotient of the second time value Td2 divided by a query time period T0 of the sensor, and then, a coefficient K4 multiplied by a quotient of the query time period T0 of the sensor divided by the second time value Td2 is added. Calculation of an output signal of the second correction circuit D0K (40) is equal to a sum of signal of the third correction circuit P1 and its derivative C2 multiplied by a coefficient of amplification Kt2. A level of signal D0K (41) is determined; if it is less than or equal to 0, then the level of zero is assigned to the signal D0K (42).

FIG. 7 shows a preprogrammed computer algorithm (Start 3-End 3) for calculation of the third correction circuit connected sequentially with the second correction circuit, with inputting the signal of a calculated integral therein rather than a coefficient of amplification. The algorithm comprises: a calculation of a first derivative DE0 (43) of the signal of the second correction circuit D0K and an integral F (43) of the derivative DE0.

The third correction circuit P (43) is calculated as a sum of the signal of the second correction circuit D0K and its derivative DE0 multiplied by the level of integral Q. The sign of derivative DE0 (44) is determined; if it is more than or equal to 0, then the derivative DM (45) of the third correction circuit P is calculated and it is equal to a difference of the signal P and its previous value PZ;
a second derivative DK (45) of the signal of the second correction circuit D0K is calculated and it is equal to a difference of the derivative DE0 and its previous value DEZ.

If the signal of derivative DE0 (44) is less than 0, then the derivative DM (46) is calculated and it is equal to a difference of the previous value of derivative PZ and the value of signal P;
the second derivative DK (46) of the signal of the second correction circuit D0K is calculated and it is equal to difference of previous values of derivative DEZ and derivative DE0.

An assignment is performed: a value of signal of the third correction circuit P is assigned to a signal PZ (47); a value of the derivative DE0 is assigned to the signal DEZ (47).

The sign of the second derivative DK (48) is determined; if it is less than or equal to 0, then the level 1 is assigned to the coefficient Y (49), which allows changing the integrand of Q, otherwise the level of 0 is assigned to the coefficient Y (35), which disallows to change the integrand of Q.

Then, a coefficient of amplification KU of an integrand A1 of the integral Q, and the time constant T are calculated.

Figures 8, 11:
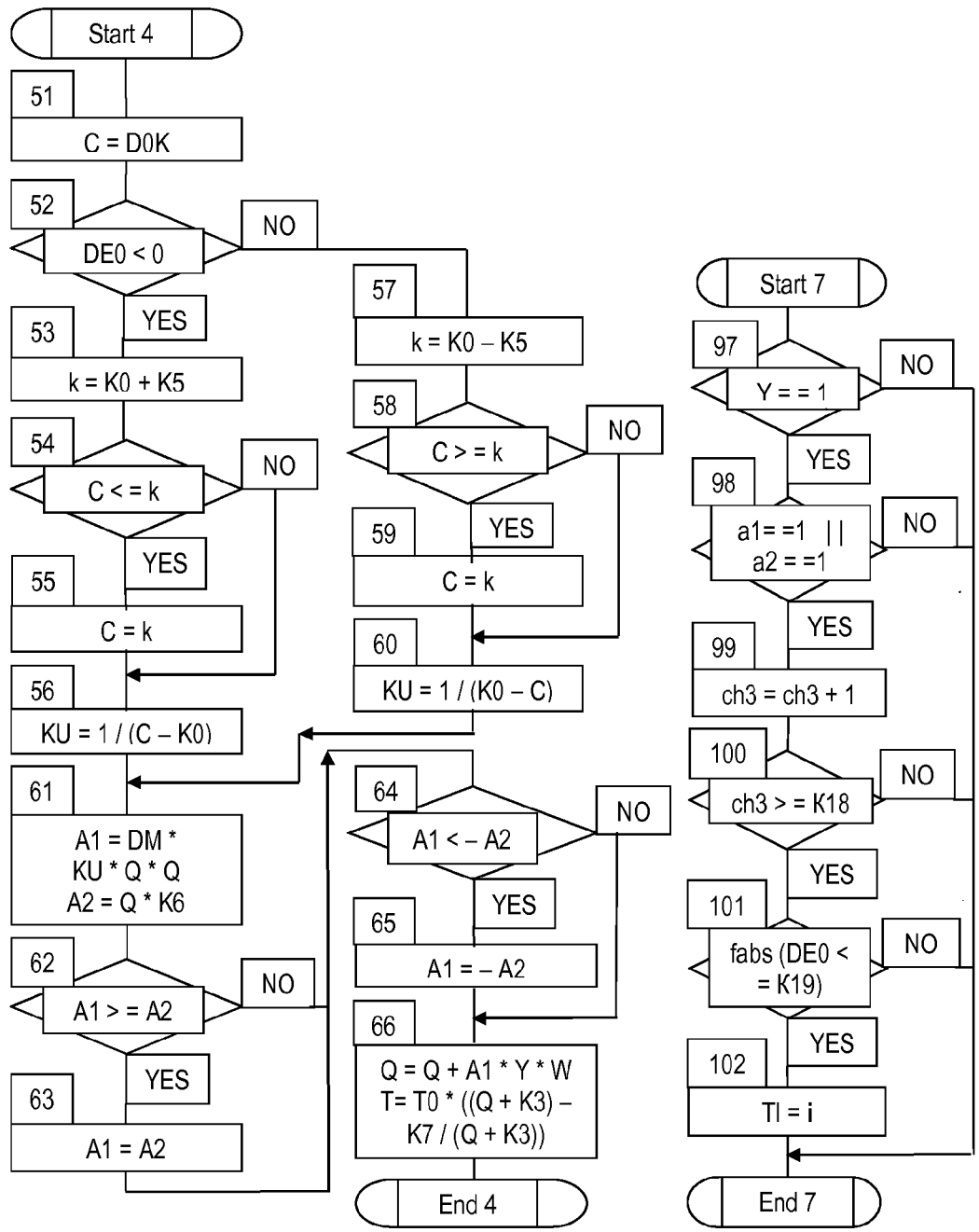
FIG. 8 shows a flowchart depicting an algorithm for calculation of the integrand, a coefficient of amplification of the integrand and the time of the element of the parameter sensor, according to a preferred embodiment of the present invention.
FIG. 11 shows a flowchart depicting an algorithm for determining an end of the cycle of calculation for time constants of a parameter sensor element, according to a preferred embodiment of the present invention.

FIG. 8 shows a preprogrammed computer algorithm (Start 4-End 4) for formation of a coefficient of amplification KU as follows: assigning a level of the signal D0K to a signal C (51), which limits the maximal value of the coefficient of amplification KU.

The sign of derivative DE0 (52) is determined; if it is less than 0, then an intermediate coefficient k (53) is calculated and it is equal to a sum of the excitation signal K0 of the parameter sensor and a coefficient K5. A level of the signal C (54) is defined, if it is less than or equal to the coefficient k, then the level of coefficient k is assigned to the signal C (55).

A coefficient of amplification KU (56) is calculated and it is equal to 1 divided by a difference of the signal C and the excitation signal K0. If the signal of derivative DE0 (42) is more than or equal to 0, then the intermediate coefficient k (57) is calculated and it is equal to a difference of the excitation signal K0 of the parameter sensor and the coefficient K5.

A level of the signal C (58) is determined, if it is more than or equal to the coefficient k, then the level of the coefficient k is assigned to the signal C (59).

A coefficient of amplification KU (60) is calculated and it is equal to 1 divided by a difference of the excitation signal K0 and the signal C.

A signal of integrand A1 (61) is calculated and it is equal to the derivative DM multiplied by the coefficient of amplification KU and the integral Q raised to the second power.

A signal A2 (61) is calculated and this signal is aimed at limiting the level of signal A1, which is equal to the level of integral Q multiplied by the coefficient K6.

The level of signal A1 (62) is determined; if it is more than or equal to the signal A2, the level of signal A2 is assigned to the signal A1 (63); if the signal A1 (64) is less than the negative signal A2, then the negative level of signal A2 is assigned to the signal A1 (65).

The integral Q (66) is calculated and it is equal to a sum of the level of integral Q and the signal A1 multiplied by coefficients Y and W, in its turn, the coefficient W is entered into the integrand of Q for stability of calculations.

The time constant T of an element (66) is calculated as a query time period T0 of the parameter sensor multiplied by an expression in parentheses, in which expression, a coefficient K7 divided by a sum of the level of integral Q and the coefficient K3, is subtracted from a sum of the level of integral Q and the coefficient K3.

Figure 9:
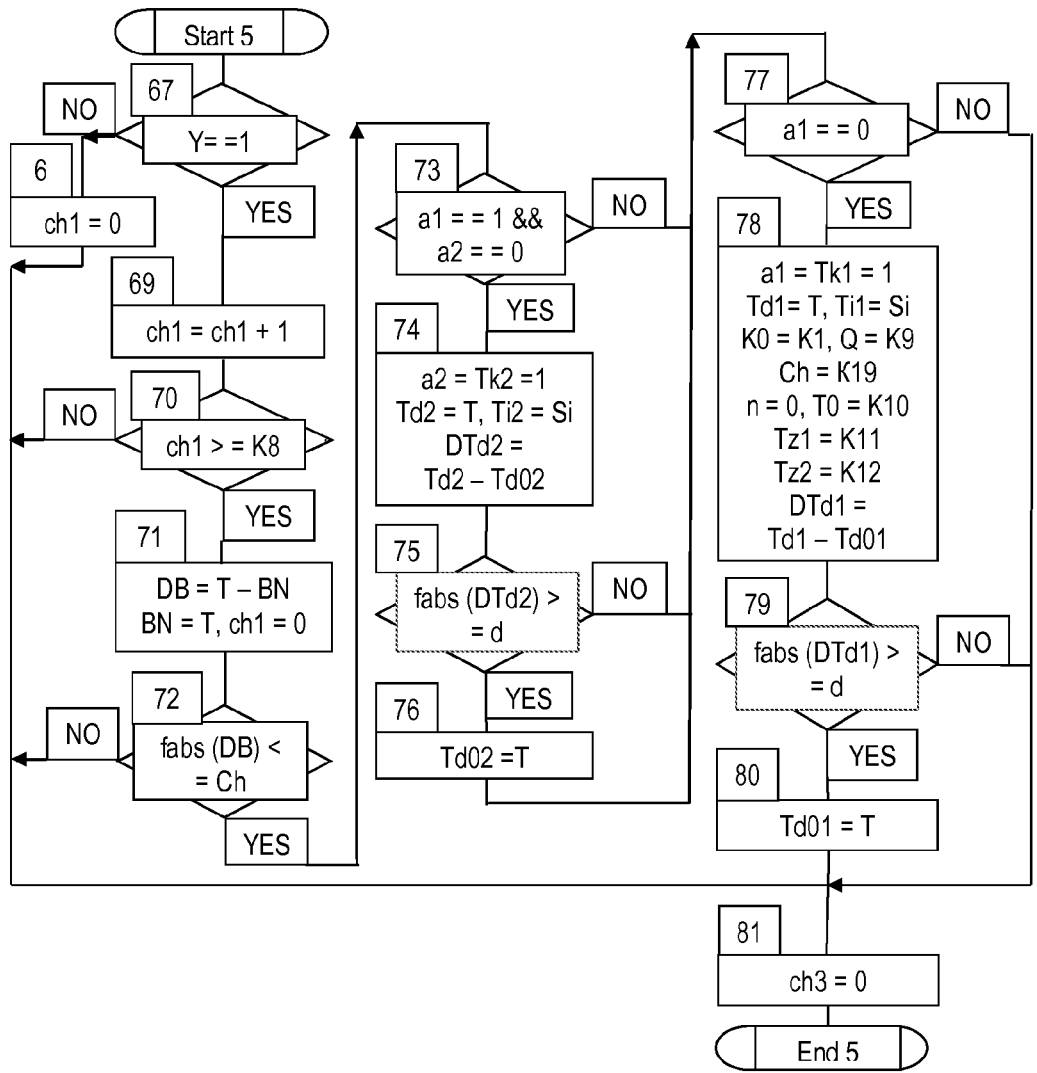
FIG. 9 shows a flowchart depicting an algorithm for a sequential operational recording during the calculation of time constants of the parameter sensor, according to a preferred embodiment of the present invention.

Then a sequential operational recording is conducted at calculating the time constants of the parameter sensor. FIG. 9 shows a preprogrammed computer algorithm (Start 5-End 5) for the aforesaid recording as follows: determining the level of signal Y (67); if it is equal to 0, a level of zero is assigned to a counter ch1 (68); if the level of signal Y is equal to 1, the counter ch1 (69) increases its value by 1.

The level of counter ch1 (70) is calculated, if the value of counter ch1 is greater than or equal to the coefficient K8, then a difference of DB (71) between the most recent calculated level of time constant T and the level of its previous value BN is calculated.

The current value of time constant T is assigned to the signal BN (71) and the level of zero is assigned to the value of counter ch1 (71).

A level of signal DB (72) is determined; if the absolute value (modulus) of signal DB is less than or equal to the accuracy of calculation Ch, recording the result of calculation of the time constant T calculation is executed, and the values of coefficients a1 and a2 (73) are determined; if the coefficients a1 and a2 are equal to 0, recording the time constant Td1 is not executed.

The value of coefficient a1 (77) is determined; if the coefficient a1 is equal to 0, recording the first time constant Td1 (78) is executed; the level of 1 is assigned to the coefficients a1 and Tk1; the first calculated value of the time constant T is assigned to the time Td1 of the first correction aperiodic element; the value of summarized current time Si is assigned to time Ti1, which registers the full time from the beginning of measurement till the recording of the first measured time Td1; the excitation coefficient K1 of the parameter sensor (which is a low-level signal) is assigned to an actuating command K0; if however a signal of higher level K2 was entered before, the coefficient K9 is assigned to an initial level of the integral Q; a coefficient K19 is assigned to the accuracy of calculation Ch;

a counter of power n is assigned 0;

a coefficient K10 is assigned to the query time period T0 of the parameter sensor;

a coefficient K11 is assigned to the minimal boundary of a dead zone Tz1;

a coefficient K12 is assigned to the maximal boundary of a dead zone Tz2.

A difference of DTd1 (78) is calculated that shows a possibility of re-recording of a new value of Td1 in the first correction element of the first correction circuit D00;

if the modulus difference of DTd1 (79) between a newly calculated time value Td1 and a time value Td01 previously recorded is less than or equal to a parameter d, then the newly calculated time T is assigned to the time value Td01 (80) and the level of zero is assigned to the counter ch3 (81).

After the next calculation of the time value T is executed, the value of coefficients a1 and a2 (73) are determined again: if the coefficient a1 is equal to 1 and at the same time the coefficient a2 is equal to 0, the time value Td2 (74) is assigned to the newly calculated time variable T, and so, wherefore the level of 1 is assigned to the coefficients a2 and Tk2; the second calculated time value T is assigned to the time variable of the second correction element Td2; the time value Si is assigned to the time variable Ti2, which registers the total time from the beginning of measurement till the recording of the second measured time value Td2.

The difference of DTd2 (74) is calculated, and it shows a possibility of re-recording a new value of Td2 in the second element of the first correction circuit D00, which is equal to the difference between the newly recorded time value Td2 and the time value Td02 previously recorded.

A level of the difference signal DTd2 (75) is calculated; if the absolute value of the difference signal DTd2 is less than or equal to a parameter d, the newly calculated time value T is assigned to the time variable Td02 (76), and the zero level is assigned to the counter variable ch3 (81).

Figure 10:
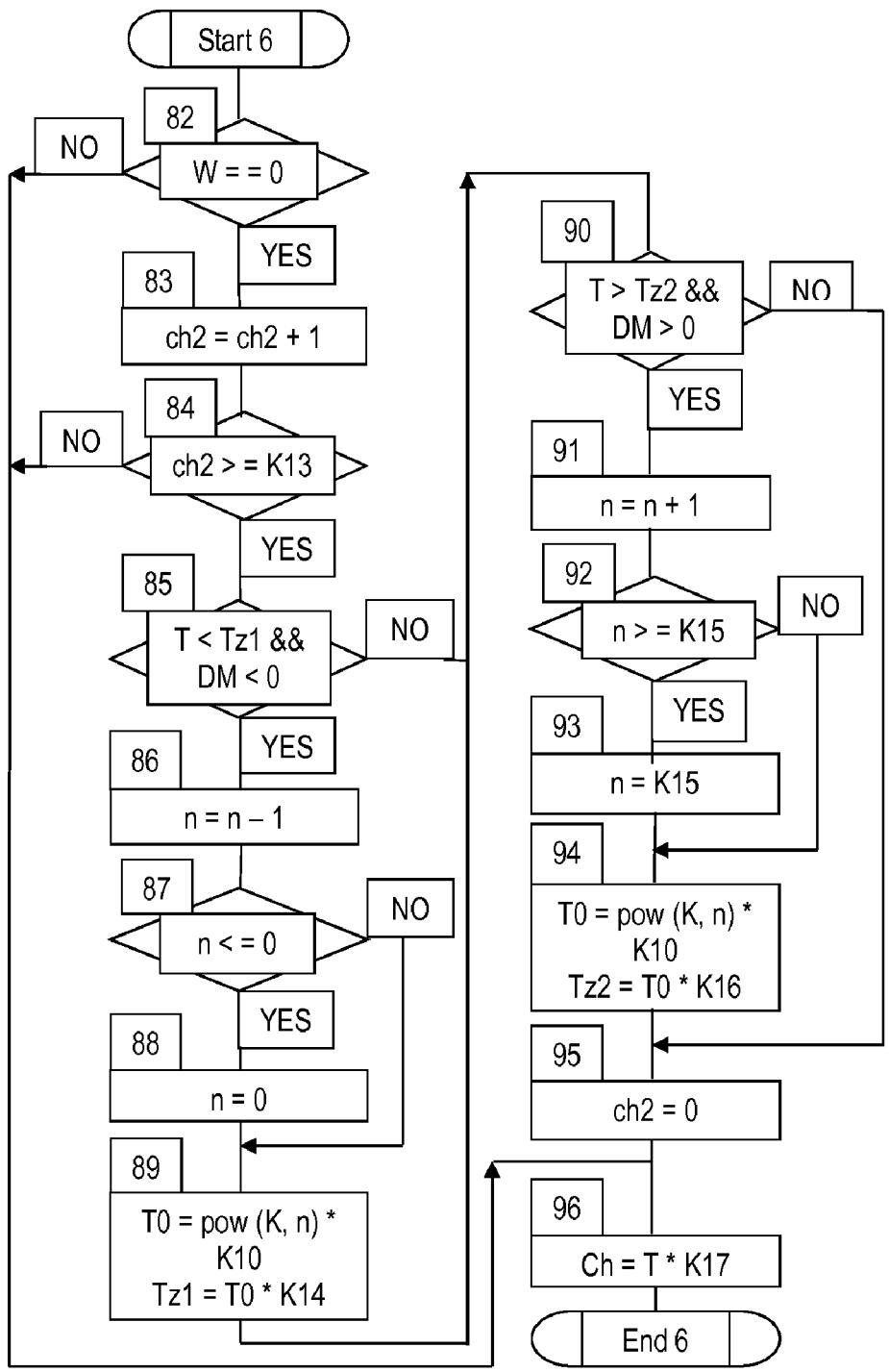
FIG. 10 shows a flowchart depicting an algorithm for calculation of a numerical value of the query time interval counter of the parameter sensor, maximal and minimal boundaries of a dead zone and an algorithm for determination of the limits for acceptable accuracy of calculation of time of the parameter sensor, according to a preferred embodiment of the present invention.

FIG. 10 shows a preprogrammed computer algorithm (Start 6-End 6) for measuring of a numerical value of the counter of query time period variable of the parameter sensor and the minimal and maximal boundaries of the dead zone.

The algorithm comprises a determination of the level of a signal W (82); if the signal W is equal to 0, the counter variable ch2 (83) increases its value by 1.

The level of counter ch2 (84) is calculated, if the reading (value) of counter ch2 is greater than or equal to the value of coefficient K13, then the level of calculated time value T (85) is determined; if the level of T is less than the minimal boundary of the dead zone Tz1 and, at that, the derivative DM is less than 0, then 1 is subtracted from a counter variable n (86) from the numerical value of power of K.

The level of counter n (87) is calculated; if the number n on the counter is less than or equal to 0, the level of zero is assigned to the counter n (88). The query time period T0 (89) of the parameter sensor signal is calculated as a value of number K raised to the power n and multiplied by the coefficient K10.

The minimal boundary of dead zone Tz1 (89) is calculated as a query time period T0 of the parameter sensor signal multiplied by the coefficient K14.

The level of calculated time constant T (90) is determined; if the level of T is greater than the maximal boundary of dead zone Tz2, and, at that, the derivative DM is greater than 0, then the counter n (91) adds 1.

The level of counter n (92) is determined, if the number n on the counter is greater than or equal to the coefficient K15, the level of coefficient K15 is assigned to counter n (93).

The query time period T0 (94) of the parameter sensor is calculated as a value of number K raised to the power n and multiplied by the coefficient K10. The maximal boundary of dead zone Tz2 (94) is calculated as the query time period T0 of the parameter sensor multiplied by the coefficient K16. The level of zero is assigned to the counter ch2 (95).

The acceptable limits of calculation accuracy Ch (96) for the parameter sensor are calculated as the time constant T of element of the parameter sensor multiplied by the coefficient K17.

Then, the end of the cycle for calculation of time constants T for elements of the parameter sensor is determined by a preprogrammed computer algorithm (Start 7-End 7), shown on FIG. 11, as follows.

Determining the level of coefficient Y (97) is performed; if it is equal to 1, then the levels of coefficients a1 and a2 (98) are determined, if the coefficient a1 or a2 is equal to 1, then the counter ch3 (99) adds 1.

The value of counter variable ch3 (100) is determined; if the counter value ch3 is greater than or equal to a coefficient K18 and, at that, the modulus first derivative DE0 (101) of the signal of the second correction circuit D0K is less than or equal to accuracy of calculation of K19, then, the current value of a control variable i is assigned to a condition variable TI (102) for continuation of the calculation cycle, which terminates the cycle.

If necessary, the moment for recording current parameters of the calculator is calculated additionally, when the time constant T of the parameter sensor is being determined by a preprogrammed computer algorithm (Start 8-End 8), shown on FIG. 12, as follows.

A level of coefficient W (103) is determined; if it is equal to 1, then 0 is assigned to the coefficient W (104); if however it is equal to 0, then 1 is assigned to the coefficient W (105). A moment for recording the calculated current parameters is determined; if the coefficient W (106) is equal to 0, and, at that, the signal Si is greater than 0, then the following signals for printing or registration (107) are outputted: Si is the summarized current time of calculations; D0 is the input signal of the parameter sensor; K0 is an output excitation signal, transmitted to the parameter sensor; D0K is an output corrected signal of the parameter sensor; T is the currently calculated time constant for an element of the parameter sensor; T0 is the query time period of the parameter sensor; and a coefficient Y, which allows/disallows calculating the time constant T of an element of the parameter sensor.

The condition of cycle continuation TI (108) is calculated; if it is equal to the current value of control variable i, then following parameters (109) are recorded only once: Ti1, which is time before recording the first calculated time value Td1 and the time value Td1 itself; Ti2 is time before recording the second calculated time Td2 and time value Td2 itself; or a temperature reading, for example, signal D00 of a medical thermometer.

A parameter sensor equivalent for a scheduled testing of the calculator of time constant T for an element of the parameter sensor is formed using a preprogrammed computer algorithm (Start 9-End 9) shown on FIG. 13.

According to the algorithm, a first time t1 (110) is calculated based on a preset time T1 of the first element, which is equal to a sum of: a quotient of the time T1 divided by the query time period T0 of the parameter sensor, plus the coefficient K3, plus the coefficient K4 multiplied by a quotient of the query time period T0 of the parameter sensor divided by the preset time T1, which must not be equal to 0.

An output signal of the first aperiodic element (111) is equal to a sum of: the signal D1 plus a difference of the excitation signal K0 and the signal of the first element D1 divided by the first time value t1. The second time t2 (112) is calculated based on a preset time T2 of the second element, which is equal to a sum of: a quotient of the time T2 divided by the query time period T0 of the parameter sensor plus the coefficient K3 plus the coefficient K4 multiplied by a quotient of the query time period T0 of the parameter sensor divided by the preset time T2, which must not be equal to 0.

An output signal of the second aperiodic element D2 (113) is equal to a sum of: the signal D2 plus a difference of the signal of the first element D1 plus the signal of the second element D2 divided by the second time value t2.

An output signal of the parameter sensor equivalent D0 (113) is equal to a sum of the following products: the signal of the first element D1 multiplied by the coefficient d1 (being the output of the 1st-order aperiodic element) plus the signal of the second element D2 multiplied by the coefficient d2 (being the output of the 2nd-order aperiodic element).

The condition whether 1 should be assigned to d1 or 0 should be assigned to d2, or, opposite, 1 should be assigned to d2 or 0 should be assigned to d1, is determined by the output signal of parameter sensor equivalent D0.

Results of a Sample of the Calculation Method

Numerical values of coefficients used in the calculation algorithm are empirically determined and presented in Table 1 below.

Results of the calculations of time constants of the parameter sensor are presented in Tables 2, 3, and 4, in which the following current parameters are recorded in progress: Si, D0, K0, D0K, T, T0, and Y, when calculating the time constant T of an element of the parameter sensor.

TABLE 1

| Coeff. | Size |
| --- | --- |
| d | 0.001 |
| K | 2 |
| K3 | 0.5 |
| K4 | 0.083333194445 |
| K5 | 0.01 |
| K6 | 0.4 |
| K7 | 0.0833338887 |
| K8 | 24 |
| K9 | 2500 |
| K10 | 0.000001 |
| K11 | 0.00025 |
| K12 | 0.00075 |
| K13 | 2 |
| K14 | 250 |
| K15 | 20 |
| K16 | 750 |
| K17 | 0.00003 |
| K18 | 12 |
| K19 | 1e-008 |

TABLE 2

| Si | D0 | K0 | D0K | T | T0 | Y |
| --- | --- | --- | --- | --- | --- | --- |
| 1e-006 | 0.6800000025 | 0.979 | 0.6800000025 | 0.0035005000 | 0.000001 | 1 |
| 0.000010 | 0.6800000249 | 0.979 | 0.6800000249 | 0.0070016124 | 0.000002 | 1 |
| 0.000016 | 0.6800000399 | 0.979 | 0.6800000399 | 0.0140032249 | 0.000004 | 0 |
| 0.000052 | 0.6800001296 | 0.979 | 0.6800001296 | 0.0280162511 | 0.000008 | 1 |
| 0.000076 | 0.6800001894 | 0.979 | 0.6800001894 | 0.0560325022 | 0.000016 | 0 |
| 0.000220 | 0.6800005482 | 0.979 | 0.6800005482 | 0.1122219173 | 0.000032 | 1 |
| 0.000316 | 0.6800007874 | 0.979 | 0.6800007874 | 0.2244438346 | 0.000064 | 0 |
| 0.000892 | 0.6800022226 | 0.979 | 0.6800022226 | 0.4514040937 | 0.000128 | 1 |
| 0.001276 | 0.6800031793 | 0.979 | 0.6800031793 | 0.9028081874 | 0.000256 | 0 |
| 0.003580 | 0.6800089200 | 0.979 | 0.6800089200 | 1.8462450835 | 0.000512 | 1 |
| 0.005116 | 0.6800127471 | 0.979 | 0.6800127471 | 3.6924901669 | 0.001024 | 0 |
| 0.014332 | 0.6800357084 | 0.979 | 0.6800357084 | 8.0564980221 | 0.002048 | 1 |
| 0.020476 | 0.6800510150 | 0.979 | 0.6800510150 | 16.1129960442 | 0.004096 | 0 |
| 0.057340 | 0.6801428380 | 0.979 | 0.6801428380 | 43.5206050406 | 0.008192 | 1 |
| 0.081916 | 0.6802040377 | 0.979 | 0.6802040377 | 87.0412100813 | 0.016384 | 0 |
| 0.229372 | 0.6805709727 | 0.979 | 0.6805709727 | 125.2633855502 | 0.262144 | 1 |
| 0.720892 | 0.6817908380 | 0.979 | 0.6817908380 | 109.4288826233 | 0.262144 | 1 |
| 1.048572 | 0.6826013101 | 0.979 | 0.6826013101 | 236.4381920446 | 0.262144 | 1 |
| 1.310716 | 0.6832480962 | 0.979 | 0.6832480962 | 141.8891231698 | 0.262144 | 1 |
| 2.228220 | 0.6855007531 | 0.979 | 0.6855007531 | 237.5567213276 | 0.262144 | 1 |
| 2.752508 | 0.6867802737 | 0.979 | 0.6867802737 | 142.5864358978 | 0.262144 | 1 |
| 3.276796 | 0.6880542161 | 0.979 | 0.6880542161 | 110.6863401321 | 0.262144 | 1 |
| 3.801084 | 0.6893226048 | 0.979 | 0.6893226048 | 118.6089100005 | 0.262144 | 1 |
| 5.373948 | 0.6930946896 | 0.979 | 0.6930946896 | 120.0000000012 | 0.262144 | 1 |

TABLE 2-continued

| Si | D0 | K0 | D0K | T | T0 | Y |
|---|---|---|---|---|---|---|
| 14.811132 | 0.7147177995 | 0.680 | 0.7147177995 | 120.0000000093 | 0.000001 | 1 |
| 14.811134 | 0.7147177990 | 0.680 | 0.6799999971 | 0.0015004999 | 0.000001 | 1 |

T1 = 120
K1 = 0.68
K2 = 0.979
Td1 = 120.0000000093
Ti1 = 14.811132

TABLE 3

| Si | D0 | K0 | D0K | T | T0 | Y |
|---|---|---|---|---|---|---|
| 1e-006 | 0.6800000000 | 0.979 | 0.6800000000 | 0.0035005000 | 0.000001 | 1 |
| 0.000010 | 0.6800000001 | 0.979 | 0.6800000001 | 0.0070010013 | 0.000002 | 1 |
| 0.000016 | 0.6800000001 | 0.979 | 0.6800000001 | 0.0140020026 | 0.000004 | 0 |
| 0.000052 | 0.6800000003 | 0.979 | 0.6800000003 | 0.0280040270 | 0.000008 | 1 |
| 0.000076 | 0.6800000004 | 0.979 | 0.6800000004 | 0.0560080541 | 0.000016 | 0 |
| 0.000220 | 0.6800000012 | 0.979 | 0.6800000012 | 0.1120164566 | 0.000032 | 1 |
| 0.000316 | 0.6800000017 | 0.979 | 0.6800000017 | 0.2240329131 | 0.000064 | 0 |
| 0.000892 | 0.6800000049 | 0.979 | 0.6800000049 | 0.4480714015 | 0.000128 | 1 |
| 0.001276 | 0.6800000071 | 0.979 | 0.6800000071 | 0.8961428030 | 0.000256 | 0 |
| 0.003580 | 0.6800000198 | 0.979 | 0.6800000198 | 1.7923748126 | 0.000512 | 1 |
| 0.005116 | 0.6800000283 | 0.979 | 0.6800000283 | 3.5847496252 | 0.001024 | 0 |
| 0.014332 | 0.6800000794 | 0.979 | 0.6800000794 | 7.1709266315 | 0.002048 | 1 |
| 0.020476 | 0.6800001134 | 0.979 | 0.6800001134 | 14.3418532629 | 0.004096 | 0 |
| 0.057340 | 0.6800003175 | 0.979 | 0.6800003175 | 28.7065523394 | 0.008192 | 1 |
| 0.081916 | 0.6800004536 | 0.979 | 0.6800004536 | 57.4131046788 | 0.016384 | 0 |
| 0.229372 | 0.6800012700 | 0.979 | 0.6800012700 | 115.1922252078 | 0.032768 | 1 |
| 0.327676 | 0.6800018143 | 0.979 | 0.6800018143 | 230.3844504156 | 0.065536 | 0 |
| 0.917500 | 0.6800050802 | 0.979 | 0.6800050802 | 466.6557895892 | 0.131072 | 1 |
| 1.310716 | 0.6800072574 | 0.979 | 0.6800072574 | 933.3115791785 | 0.262144 | 0 |
| 3.670012 | 0.6800203203 | 0.979 | 0.6800203203 | 1962.6891593324 | 0.524288 | 1 |
| 9.437180 | 0.6800522494 | 0.979 | 0.6800522494 | 4489.7205563062 | 1.048576 | 1 |
| 13.631484 | 0.6800754685 | 0.979 | 0.6800754685 | 5225.4913062425 | 1.048576 | 1 |
| 19.922940 | 0.6801102937 | 0.979 | 0.6801102937 | 6850.3063971800 | 1.048576 | 1 |
| 22.020092 | 0.6801219012 | 0.979 | 0.6801219012 | 7608.9770976493 | 1.048576 | 1 |
| 24.117244 | 0.6801335083 | 0.979 | 0.6801335083 | 8529.9514707773 | 1.048576 | 1 |
| 26.214396 | 0.6801451149 | 0.979 | 0.6801451149 | 9664.4033717555 | 1.048576 | 1 |
| 30.408700 | 0.6801683267 | 0.979 | 0.6801683267 | 12892.4418353834 | 1.048576 | 1 |
| 34.603004 | 0.6801915367 | 0.979 | 0.6801915367 | 18321.0536385737 | 1.048576 | 1 |
| 38.797308 | 0.6802147450 | 0.979 | 0.6802147450 | 27873.9559201359 | 1.048576 | 1 |
| 40.894460 | 0.6802263484 | 0.979 | 0.6802263484 | 34835.0198964478 | 1.048576 | 1 |
| 42.991612 | 0.6802379514 | 0.979 | 0.6802379514 | 42810.3436537337 | 1.048576 | 1 |
| 45.088764 | 0.6802495540 | 0.979 | 0.6802495540 | 49843.0970594499 | 1.048576 | 1 |
| 47.185916 | 0.6802611560 | 0.979 | 0.6802611560 | 53384.6403930483 | 1.048576 | 1 |
| 63.963132 | 0.6803539566 | 0.979 | 0.6803539566 | 53999.9992420385 | 1.048576 | 1 |
| 80.740348 | 0.6804467282 | 0.680 | 0.6804467282 | 53999.9947846226 | 0.000001 | 1 |
| 80.740350 | 0.6804467282 | 0.680 | 0.6799970880 | 0.0015004999 | 0.000001 | 1 |

T1 = 54000
K1 = 0.68
K2 = 0.979
Ti1 = 80.740348
Td1 = 53999.9947846226

TABLE 4

| Si | D0 | K0 | D0K | T | T0 | Y |
|---|---|---|---|---|---|---|
| 1e-006 | 0.6800000000 | 0.979 | 0.6800000000 | 0.0035005000 | 0.000001 | 1 |
| 0.458748 | 0.6800028311 | 0.979 | 0.6800028311 | 229.4087664410 | 0.065536 | 0 |
| 0.917500 | 0.6800112349 | 0.979 | 0.6800112349 | 458.8175328820 | 0.131072 | 0 |
| 1.310716 | 0.6800228783 | 0.979 | 0.6800228783 | 917.6350657641 | 0.262144 | 0 |
| 2.621436 | 0.6800894903 | 0.979 | 0.6800894903 | 1835.2701315282 | 0.524288 | 0 |
| 5.242876 | 0.6803425413 | 0.979 | 0.6803425413 | 3670.5402630564 | 1.048576 | 0 |
| 70.254588 | 0.7044036211 | 0.979 | 0.7044036211 | 3670.5402630564 | 1.048576 | 0 |
| 72.351740 | 0.7053330807 | 0.979 | 0.7053330807 | 5138.5466701955 | 1.048576 | 1 |
| 74.448892 | 0.7062621492 | 0.979 | 0.7062621492 | 3083.3376982993 | 1.048576 | 1 |
| 78.643196 | 0.7062621492 | 0.979 | 0.7062621492 | 1882.9553725342 | 1.048576 | 1 |
| 84.934652 | 0.7108927009 | 0.979 | 0.7108927009 | 871.7287485726 | 1.048576 | 1 |
| 87.031804 | 0.7118144170 | 0.979 | 0.7118144170 | 1119.4144257279 | 1.048576 | 1 |
| 91.226108 | 0.7136521781 | 0.979 | 0.7136521781 | 965.6856003140 | 1.048576 | 1 |
| 95.420412 | 0.7154815807 | 0.979 | 0.7154815807 | 857.7088568527 | 1.048576 | 1 |
| 99.614716 | 0.7173018424 | 0.979 | 0.7173018424 | 788.4051104516 | 1.048576 | 1 |

TABLE 4-continued

| Si | D0 | K0 | D0K | T | T0 | Y |
|---|---|---|---|---|---|---|
| 108.003324 | 0.7209126047 | 0.979 | 0.7209126047 | 712.6142064936 | 1.048576 | 1 |
| 120.586236 | 0.7262485746 | 0.979 | 0.7262485746 | 656.8352162458 | 1.048576 | 1 |
| 133.169148 | 0.7314832180 | 0.979 | 0.7314832180 | 629.7661466610 | 1.048576 | 1 |
| 145.752060 | 0.7366142431 | 0.979 | 0.7366142431 | 615.8762774442 | 1.048576 | 1 |
| 158.334972 | 0.7416414576 | 0.979 | 0.7416414576 | 608.5484122085 | 1.048576 | 1 |
| 179.306492 | 0.7497921828 | 0.979 | 0.7497921828 | 603.0768472300 | 1.048576 | 1 |
| 198.180860 | 0.7568894686 | 0.979 | 0.7568894686 | 601.2322724801 | 1.048576 | 1 |
| 321.912828 | 0.7982784526 | 0.680 | 0.7982784526 | 600.0031091404 | 0.000001 | 1 |
| 321.912831 | 0.7982784535 | 0.680 | 0.9744586373 | 0.0030009999 | 0.000002 | 1 |
| 321.941509 | 0.7982868636 | 0.680 | 0.9740541184 | 8.5537239950 | 0.004096 | 1 |
| 321.994757 | 0.7983024225 | 0.680 | 0.9733242900 | 38.4482369652 | 0.016384 | 0 |
| 322.093061 | 0.7983309581 | 0.680 | 0.9718860767 | 19.8987215825 | 0.016384 | 1 |
| 322.142213 | 0.7983451331 | 0.680 | 0.9712381544 | 39.7974431650 | 0.032768 | 0 |
| 322.207749 | 0.7983639385 | 0.680 | 0.9702853850 | 23.8850171018 | 0.032768 | 1 |
| 322.338821 | 0.7984012319 | 0.680 | 0.9683891868 | 19.7364733903 | 0.032768 | 1 |
| 322.732037 | 0.7985105995 | 0.680 | 0.9627745866 | 19.9999984705 | 0.032768 | 1 |
| 323.715077 | 0.7987679424 | 0.680 | 0.9492116713 | 20.0000569106 | 0.032768 | 1 |
| 323.747846 | 0.7987761345 | 0.979 | 0.0000000000 | 0.0025005000 | 0.000001 | 0 |
| 323.747848 | 0.7987761350 | 0.979 | 0.9536480815 | 0.0015004999 | 0.000001 | 1 |
| 323.747858 | 0.7987761375 | 0.979 | 0.9536480840 | 0.0015006108 | 0.000001 | 1 |

T1 = 600
T2 = 20
K1 = 0.68
K2 = 0.979
Ti1 = 321.912828 s.
Ti2 = 323.715077 s.
Td1 = 600.0031091404 s.
Td2 = 20.0000569106 s.

Table 2 shows calculations of the time constant T of one aperiodic element of the parameter sensor with the following original input parameters: a preset time of one aperiodic element T1 is equal to 120 sec. (2 minutes); the original temperature 68° F. (20° C.) is represented by coefficient K1, which is equal to 0.68; then the temperature jumped up to 97.9° F. (36.6° C.) and applied to the parameter sensor input that is represented by coefficient K2, which is equal to 0.979.

Final output parameters of the counter are the following: the summarized time of the calculation at the first Ti1 switch being active is 14.811132 sec. and the calculated time Td1 is 120.0000000093 sec.

After Ti1 and Td1 are calculated, the input temperature is changed from 97.9° F. (36.6° C.) down to 68° F. (20° C.) and then again up to 97.9° F. (36.6° C.) together with the query time period T0 being changed.

As it can be seen in the table, the output temperature parameter rapidly follows the input temperature changes during 1-2 microseconds. As a result, the input aperiodic element with the preset time T1 equal to 120 sec. (2 minutes) is reduced and in such a way, a higher speed and better accuracy of the parameter sensor prediction are achieved.

Table 3 shows calculations of the time constant T for one aperiodic element of the parameter sensor with the following original input parameters: the preset time of one 1st order aperiodic element T1 is equal to 54000 sec. (15 hours); the original input parameters are the following: the original temperature 68° F. (20° C.) is represented by the coefficient K1, which is equal to 0.68; then the temperature jumped up to 97.9° F. (36.6° C.) and applied to the parameter sensor input that is represented by the coefficient K2, which is equal to 0.979.

The final output parameters of the counter are the following: the summarized time of the calculation at the first Ti1 switch being active is 80.740348 sec. and the calculated time Td1 is 53999.9947846226 sec.

After Ti1 and Td1 are calculated, the input temperature is changed from 97.9° F. (36.6° C.) down to 68° F. (20° C.) and then again up to 97.9° F. (36.6° C.) together with the query time period T0 being changed. When the input signal is changed, the output parameter rapidly follows the input signal during 1-2 microseconds. This also confirms that the input 1st order aperiodic element with a preset time equal to 54000 sec. (15 hours) is reduced, thereby achieving a higher speed and better accuracy of prediction of the parameter sensor.

Table 4 shows calculations of the time constant T of a 2ndorderaperiodic element with the following original input parameters: the preset times of elements T1 is equal to 600 sec. (10 minutes) and T2 is equal to 20 seconds, the original temperature 68° F. (20° C.) is represented by the coefficient K1, which is equal to 0.68; then the temperature of the 2ndorderaperiodic element jumped up to 97.9° F. (36.6° C.) and applied to the parameter sensor input that is represented by the coefficient K2, which is equal to 0.979.

The final output parameters of the counter are the following: the summarized time of the calculation of the first time Ti1 is 321.912828 sec. at the first switch, and the calculated first time Td1 is 600.0031091404 sec., but the summarized time of the calculation of second time T12 is 323.715077 sec. at the first switch and the time Td2 is 20.0000569106 sec.

After Ti1, Td1, Ti2, and Td2 are calculated, the input temperature is changed from 68° F. (20° C.) down to 97.9° F. (36.6° C.), and the output parameter temperature rapidly follows the reading of input temperature 97.9° F. (36.6° C.) during 0.0655 sec. As it can be seen on the table, the input 2nd order aperiodic element with the preset time T1 equal to 600 sec. (10 minutes) and the preset time T2 equal to 20 sec. are reduced thereby achieving a higher speed and better accuracy.

Thusly, the inventive method for prediction of a response of a parameter sensor disclosed herein allows for calculating time constant of the 1st and 2nd order aperiodic elements, included into a transfer function of the parameter sensor, and a prediction of response thereof, as a result of which a higher speed and better accuracy of parameter measuring are achieved, which in turn ensures timely regulation and control over the parameters in different production facilities during exploitation thereof.

REFERENCES

[R-1] Information generators: Patent JP 2011075580 (A), PREDICTIVE TEMPERATURE MEASUREMENT SYSTEM Public. date: 2011 Apr. 14;
Also published as: WO 0070316 (A1) more.
[R-2] Information generators: WO 2011061033 (A1), ESTIMATION OF AMBIENT TEMPERATURE Public. date: 2011 May 26;
Cited documents: US2009144014 (A1), US2003064749 (A1), US2009192757 (A1), U.S. Pat. No. 4,096,575 (A).
WO 0070316 (A1)
WO 2011061033 (A1)

We claim:

1. A method for prediction of a response of a parameter sensor (D0) used for measuring a parameter of an external object;
said parameter sensor (D0) is associated with a pre-programmed microprocessor herein called a first correction circuit (D00) comprising two correction elements;
said parameter sensor (D0) is associated with a microprocessor implementing a program called a calculator, said calculator includes:
a power counter (n);
a control variable (i); and
a repetitive program cycle 'for' with a cycle continuation variable (TI);
said calculator is characterized with:
a time constant (T) characterized with limits of calculation accuracy (Ch);
a predetermined time parameter called a dead zone, and characterizing a range of changing the time constant T, said dead zone has a predetermined minimal boundary (Tz1) and a predetermined maximal boundary (Tz2);
a variable (Si) holding a time value passed from the beginning of calculation carried out by the calculator;
a first time variable (Td1);
a second time variable (Td2); and
a query time period (T0) of said parameter sensor (D0);
said parameter sensor (D0) is associated with a pre-programmed microprocessor herein called a second correction circuit (D0K) comprising two correction elements; and
said parameter sensor (D0) is associated with a pre-programmed microprocessor herein called a third correction circuit (P) comprising one correction element;
said method comprising the steps of:
determining a first derivative and a second derivative of said parameter;
determining output signals of each said correction element of the first correction circuit (D00);
setting up the cycle 'for' and assigning to the variable (Si) of a 0-value thereby starting time counting carried out by the calculator;
forming the first correction circuit (D00) arranged sequentially with said parameter sensor (D0);
determining output signals of each said element of the second correction circuit (D0K);
forming the second correction circuit (D0K) arranged sequentially with said parameter sensor (D0);
forming the third correction circuit (P) connected with said parameter sensor (D0);
determining a first derivative (DM) of an output signal of the third correction circuit (P);
using said calculator, calculating the time constant (T) of the aperiodic element recording the time constant (T) calculated and assigning thereof to the first time variable (Td1);
entering the first time variable (Td1) into the first element of the second correction circuit (D0K);
using said calculator, calculating a next value of said time constant (T) and assigning thereof to the second time variable (Td2);
entering the second time variable (Td2) into the second element of the second correction circuit (D0K);
using said calculator, continuously calculating a current value of the time constant (T), while determining a condition of:
if the current value of the time constant (T) is lower than the minimal boundary (Tz1) and the derivative (DM) is lower than zero, then the power counter (n) subtracts 1;
if the current value of the time constant (T) is greater than the maximal boundary (Tz2) and the derivative (DM) is greater than zero, then the power counter (n) sums up 1;
calculating new values of the query time period (T0), based on the current value of said time constant (T);
based on the calculated value of said query time period (T0),
determining the current value of said minimal boundary (Tz1), when the power counter (n) subtracts 1, and
determining the current value of said maximal boundary (Tz2), when the power counter (n) sums up 1;
continuously determining said limits of the calculation accuracy (Ch);
continuously recording the current values of the power counter (n);
entering the calculated current time variables (Td1) and (Td2) into the second correction circuit (D0K);
determining a time of termination of the cycle 'for'; and
determining a first derivative (DB0) of the signal of said second correction circuit (D0K) and a modulus thereof, if the modulus is less than a preset coefficient (K19), then a current value of said control variable (i) is assigned to the cycle continuation variable (TI).

2. The method according to claim 1, wherein said output signal of the first correction element (P01) of the first correction circuit (D00) is calculated by the following formula:

$$P01 = D0 + C01 * Kt01,$$

wherein:
P01 is an output signal of the first correction element;
D0 is an output signal of parameter sensor;
C01 is a derivative of said output signal of the parameter sensor;

$$C01 = D0 - E01;$$

$$E01 = E01 + C01;$$

wherein E01 is an integral function of the derivative C01;

$$Kt01 = Tk01 * ((Td01/T0) - K3 + K4 * (T0/Td01));$$

wherein:
Kt01 is a first coefficient of amplification;
Tk01 is a protection coefficient;
Td01 is a first time of the first correction element;
T0 is the query time period of said parameter sensor;
K3 is a coefficient equal to 0.5; and
K4 is a coefficient equal to 0.083333194445.

3. The method according to claim 1, wherein said output signal of the second correction element of the first correction circuit (D00) is calculated by formula below:

$$D00=P01+C02*Kt02,$$

wherein:
D00 is an output signal of the first correction circuit, which corresponds to output signal of the second correction element;
P01 is an output signal of the first correction element;
C02 is a derivative of the first correction element signal;
Kt02 is a second coefficient of amplification from the time Td02;

$$C02=P01-E02;$$

$$E02=E02+C02;$$

E02 is an integral from the derivative C02;

$$Kt02=Tk02*((Td02/T0)-K3+K4*(T0/Td02));$$

Tk02 is a coefficient of protection;
Td02 is a second time of the second correction element;
T0 is the query time period of said parameter sensor;
K3 is a coefficient, which is equal to 0.5;
K4 is a coefficient, which is equal to 0.083333194445.

4. The method according to claim 1, wherein said time (Si) up to the time for record (T) is calculated by formula below:

$$Si=Si+T0.$$

5. The method according to claim 1, wherein said output signal of the first correction element (P1) of the second correction circuit (D0K) is calculated by formula below:

$$P1=D0+C1*Kt1,$$

wherein:
P1 is an output signal of the first correction element;
D0 is an output signal of said parameter sensor;
C1 is a derivative of the signal of said parameter sensor;
Kt1 is a first coefficient of amplification from the first time Td1;

$$C1=D0-E1;$$

$$E1=E1+C1;$$

E1 is an integral from derivative C1;

$$Kt1=Tk1*((Td1/T0)-K3+K4*(T0/Td1));$$

Tk1 is a coefficient of protection;
Td1 is a first time of the first correction element;
T0 is the query time period of said parameter sensor;
K3 is coefficient, which is equal to 0.5;
K4 is a coefficient, which is equal to 0.083333194445.

6. The method according to claim 1, wherein said output signal of the second correction element of the second correction circuit (D0K) is calculated by formula below:

$$D0K=P1+C2*Kt2,$$

wherein:
D0K is an output signal of the second correction circuit, which corresponds to output signal of the second correction element;
P1 is an output signal of the first correction element;
C2 is a derivative of the first correction element signal;
Kt2 is a second coefficient of amplification from the second time Td2;

$$C2=P1-E2;$$

$$E2=E2+C2;$$

E2 is an integral from the derivative C2;

$$Kt2=Tk2*((Td2/T0)-K3+K4*(T0/Td2));$$

Tk2 is a coefficient of protection;
Td2 is the second time of the second correction element;
T0 is the query time period of said parameter sensor;
K3 is a coefficient, which is equal to 0.5;
K4 is a coefficient, which is equal to 0.083333194445.

7. The method according to claim 1, wherein said output signal of the third correction circuit (P) is calculated by formula below:

$$P=D0K+DE0*Q,$$

wherein:
P is an output signal of the third correction circuit;
D0K is an output signal of the second correction circuit;
DE0 is a first derivative from output signal of the second correction circuit D0K;
Q is an integral, which is proportional to calculated time T;

$$DE0=D0K-F;$$

$$F=F+DE0;$$

F is an integral from the derivative DE0;

$$Q=Q+A1*Y*W;$$

A1 is a temporary variable, which manipulates integral;
Y is a coefficient, which allows/disallows to calculate integral that is defined through the second derivative DK from the signal of the second correction circuit D0K;
W is a coefficient of stability of integral calculation, which changes every tact from zero into one and vice versa;

$$A1=DM*KU*Q^2;$$

DM is a first derivative of output signal of the third correction circuit (P);
KU is a coefficient of amplification dependable from the level of the output signal of the second correction circuit D0K and actuating signal K0 of said parameter sensor.

8. The method according to claim 1, wherein said element time constant (T) of the parameter sensor (D0) is defined in accordance to the query time period of said parameter sensor (T0) and is calculated by formula below:

$$T=T0*((Q+K3)-K7/(Q+K3)),$$

wherein:
T is an element time constant of parameter sensor D0;
T0 is the query time period of said parameter sensor;
Q is an integral;
K3 is a coefficient, which is equal to 0.5;
K7 is a coefficient, which is equal to 0.0833338887.

9. The method according to claim 8, wherein query time period of said parameter sensor (T0) is calculated by formula below:

$$T0=\text{pow}(K,n)*K10,$$

wherein:
T0 is the query time period of said parameter sensor;
pow (K, n) is a number K raised to the 'n' power;
K10 is a coefficient, which is equal to 0.000001.

10. The method according to claim 1, wherein said value of the minimal boundary of dead zone (Tz1) is calculated by formula below:

$$Tz1=T0*K14,$$

wherein:
Tz1 is a minimal boundary of dead zone;
K14 is a coefficient, which is equal to 250.

11. The method according to claim 1, wherein said value of the maximal boundary of dead zone (Tz2) is calculated by formula below:

$$Tz2 = T0 * K16,$$

wherein:
Tz2 is the maximal boundary of said dead zone;
K16 is a coefficient, which is equal to 750.

12. The method according to claim 1, wherein determining the calculation accuracy (Ch) of the calculated time (T) on a formula:

$$Ch = T * K17,$$

where:
T is an element time constant of said parameter sensor D0;
K17 is coefficient, which is equal to 0.00003.

13. The method according to claim 1, wherein said value of the first output signal (D1) of said parameter sensor equivalent (D0) is calculated by formula below:

$$D1 = D1 + (K0 - D1)/t1,$$

where:
D1 is a first output signal of parameter sensor equivalent (D0) being an output signal of the lag element (LE);
K0 is an actuating signal of parameter sensor;
t1 is a time of the first lag element (LE) from the first time to be set (T1);

$$t1 = (T1/T0) + K3 + K4 * (T0/T1);$$

T1 is a first time to be set of the first element;
T0 is a time of inquiry of parameter sensor;
K3 is a coefficient, which is equal to 0.5;
K4 is a coefficient, which is equal to 0.083333194445.

14. The method according to claim 1, wherein said value of the second output signal (D2) of said parameter sensor equivalent (D0) is calculated by formula below:

$$D2 = D2 + (D1 - D2)/t2,$$

where:
D2—second output signal of parameter sensor equivalent (D0) (output signal of the second lag element);
D1—output signal of the first lag element;
t2—time of the second lag element (LE) from the second time to be set (T2);

$$t2 = (T2/T0) + K3 + K4 * (T0/T2);$$

T2 is a second time to be set of the second element;
T0 is the query time period of said parameter sensor;
K3 is a coefficient, which is equal to 0.5;
K4 is a coefficient, which is equal to 0.083333194445.

15. The method according to claim 1, said method comprising forming an equivalent of an output signal of the parameter sensor (D0) for checking said calculator, wherein said checking of the calculator is performed by output signal of said parameter sensor equivalent:

$$D0 = D1 * d1 + D2 * d2,$$

wherein:
D1 is an output signal of the first lag element;
d1 is a coefficient of choice, if d1=1, then coefficient of choice d2=0, and vise-versa;
D2 is an output signal of the second lag element; and
d2 is a coefficient of choice.

* * * * *